(12) United States Patent
Nakanishi et al.

(10) Patent No.: US 12,547,210 B2
(45) Date of Patent: Feb. 10, 2026

(54) TAPE MEMBER AND ELECTRONIC APPARATUS

(71) Applicant: LENOVO (SINGAPORE) PTE. LTD., Singapore (SG)

(72) Inventors: So Nakanishi, Yokohama (JP); Satoshi Hosoya, Yokohama (JP); Takehito Yamauchi, Yokohama (JP); Keita Ishikawa, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 337 days.

(21) Appl. No.: 18/363,844

(22) Filed: Aug. 2, 2023

(65) Prior Publication Data

US 2024/0111335 A1    Apr. 4, 2024

(30) Foreign Application Priority Data

Oct. 4, 2022    (JP) ................. 2022-160036

(51) Int. Cl.
  *G06F 1/16*    (2006.01)
  *C09J 7/10*    (2018.01)

(52) U.S. Cl.
  CPC ............. *G06F 1/1637* (2013.01); *C09J 7/10* (2018.01); *G06F 1/1656* (2013.01); *C09J 2203/318* (2013.01); *C09J 2301/124* (2020.08); *C09J 2301/308* (2020.08)

(58) Field of Classification Search
  CPC .... G06F 1/1637; G06F 1/1656; G06F 1/1654; G06F 1/1675; C09J 7/10; C09J 2203/318; C09J 2301/124; C09J 2301/308; C09J 7/00
  See application file for complete search history.

(56) References Cited

U.S. PATENT DOCUMENTS

| | | | |
|---|---|---|---|
| 6,641,910 B1 * | 11/2003 | Bries ......................... | C09J 7/403 |
| | | | 428/56 |
| 7,892,384 B2 * | 2/2011 | Bartusiak .................. | B32B 3/00 |
| | | | 156/196 |
| 10,870,258 B2 * | 12/2020 | Zeng ......................... | C09J 201/02 |
| 2007/0059520 A1 | 3/2007 | Hatin et al. | |

FOREIGN PATENT DOCUMENTS

| | | | |
|---|---|---|---|
| JP | 2002069398 | A | 3/2002 |
| JP | 2022074877 | A | 5/2022 |
| JP | 2022079985 | A | 5/2022 |
| JP | 7320650 | B1 | 8/2023 |
| WO | 2016067324 | A1 | 5/2016 |

* cited by examiner

*Primary Examiner* — Patricia L. Nordmeyer
(74) *Attorney, Agent, or Firm* — SHIMOKAJI IP

(57) ABSTRACT

A tape member of an electronic apparatus includes: double-sided adhesive tape having a releasable property by stretching; and a sheet-shaped handle member connected to the double-sided adhesive tape, a user holding the handle member when stretch-releasing the double-sided adhesive tape. The handle member is wound around the double-sided adhesive tape in a direction intersecting the longitudinal direction of the double-sided adhesive tape.

8 Claims, 7 Drawing Sheets

TAPE MEMBER AND ELECTRONIC APPARATUS

BACKGROUND OF THE INVENTION

Field of the Invention

The present invention relates to a tape member and an electronic apparatus including a display panel fixed with the tape member.

Description of the Related Art

An electronic apparatus such as a laptop PC includes a display panel such as a liquid crystal display. Desirably the display panel can be removed for maintenance. Japanese Unexamined Patent Application Publication No. 2022-079985 discloses a configuration of fixing a display panel with double-sided adhesive tape that is releasable by stretching.

SUMMARY OF THE INVENTION

In the configuration of fixing the display panel with double-sided adhesive tape as described above, a tab for holding when stretch-releasing the tape needs to protrude from the lateral of the display panel. Some structures of the chassis, however, may hinder the placement of such a tab near the fixed position of the display panel with double-sided adhesive tape.

In such a case, a sheet-shaped handle member may be connected to an end of the double-sided adhesive tape, and this handle member has a shape extending to the lateral of the display panel. It has been found, however, that the structure of a handle member connected to the double-sided adhesive tape has a problem that the handle member comes off the double-sided adhesive tape if the double-sided adhesive tape is stretched over a long distance, for instance. If the handle member comes off the double-sided adhesive tape during releasing, the double-sided adhesive tape may remain on the rear of the display panel, making it difficult to remove the display panel.

In view of the problems of the conventional techniques, the present invention provides a tape member and an electronic apparatus including a display panel fixed with the tape member, which are capable of suppressing the detachment of a handle member from double-sided adhesive tape.

A tape member according to the first aspect of the present invention includes: double-sided adhesive tape having a releasable property by stretching; and a sheet-shaped handle member connected to the double-sided adhesive tape, a user holding the handle member when stretch-releasing the double-sided adhesive tape. The handle member is wound around the double-sided adhesive tape in a direction intersecting the longitudinal direction of the double-sided adhesive tape.

An electronic apparatus according to the second aspect of the present invention includes: a chassis member having an inner face; a display panel having a display surface and a rear face opposite to the display surface, the rear face being supported by the inner face of the chassis member; and a tape member including double-sided adhesive tape having a releasable property by stretching; and a sheet-shaped handle member connected to the double-sided adhesive tape, a user holding the handle member when stretch-releasing the double-sided adhesive tape, the tape member fixing the rear face of the display panel to the inner face of the chassis member. The handle member is wound around the double-sided adhesive tape in a direction intersecting the longitudinal direction of the double-sided adhesive tape.

The above-described aspects of the present invention prevent the handle member from coming off the double-sided adhesive tape.

DETAILED DESCRIPTION OF THE INVENTION

Figure 1:
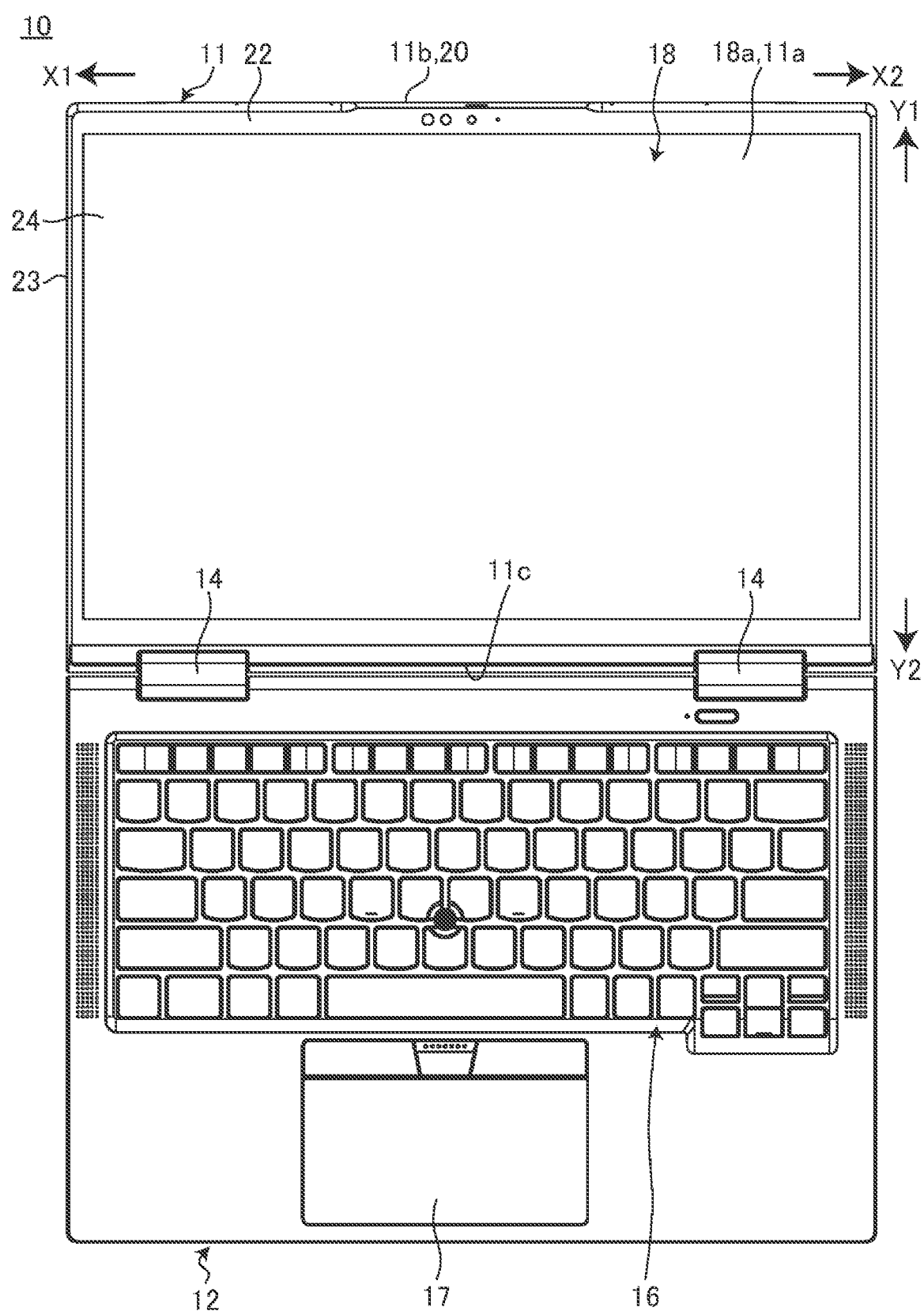
FIG. 1 is a schematic top plan view of an electronic apparatus according to one embodiment.

Referring to the drawings, the following describes a tape member and an electronic apparatus according to the present invention in details by way of a preferable embodiment.

FIG. 1 is a schematic top plan view of an electronic apparatus 10 according to one embodiment. As illustrated in FIG. 1, the electronic apparatus 10 of the present embodiment is a clamshell-type laptop PC, and includes a first chassis 11 and a second chassis 12 that are relatively rotatably connected with hinges 14. The present embodiment exemplifies the electronic apparatus 10 that is a laptop PC, which may be of various types other than the laptop PC, including a stand-alone display device, a tablet PC, a smartphone, and a portable game machine.

The second chassis 12 is a flattened box, and is adjacent to the first chassis 11. The second chassis 12 internally houses a motherboard with a CPU and the like mounted thereon and various types of electronic components such as a battery device, a memory and an antenna device. The second chassis 12 faces a keyboard 16 and a touchpad 17 on the top face.

The first chassis 11 is a flattened box that is thinner than the second chassis 12. The first chassis 11 comes with a display panel 18. The following describes the first chassis 11 and elements mounted on the chassis with reference to the direction viewed from the user viewing the display surface 18a of the display panel 18, where the left and right directions are referred to as X1 and X2 directions, the top and bottom directions are referred to as Y1 and Y2 directions, and the depth directions are referred to as Z1 and Z2 directions. X1 and X2 directions may be collectively referred to as X direction, and Y1 and Y2 directions and Z1 and Z2 directions may also be referred to in the same way.

The display surface 18a of the display panel 18 faces the Z1-side surface (front face 1a) of the first chassis 11. The first chassis 11 has a cover member 20 that defines the Z2-side surface (back face 11b), and a bezel member 22 that defines a peripheral edge of the front face 11a. The top, bottom, left, and right side faces of the first chassis 11 are formed by standing walls 23 that rise from the four peripheral edges of the cover member 20. The bezel member 22 is a frame-shaped thin plate member that surrounds the peripheral edge of the display panel 18. Almost the entire surface of the front face 11a of the first chassis 11, including the bezel member 22, is covered with a touch glass 24. The hinges 14 are connected to the Y2-side edge of the first chassis 11 (lower edge 11c).

The display panel 18 includes a liquid crystal display or an organic EL display, for example. For instance, the display panel 18 is configured so that layers including, glass, a liquid crystal layer, and a light guide plate are stacked and the outer peripheral edges of these layers are fixed with double-sided tape, an adhesive, or the like. The touch glass 24 covers the display surface 18a, thus constituting a touch panel that accepts touch operations on the display panel 18.

Figure 2:
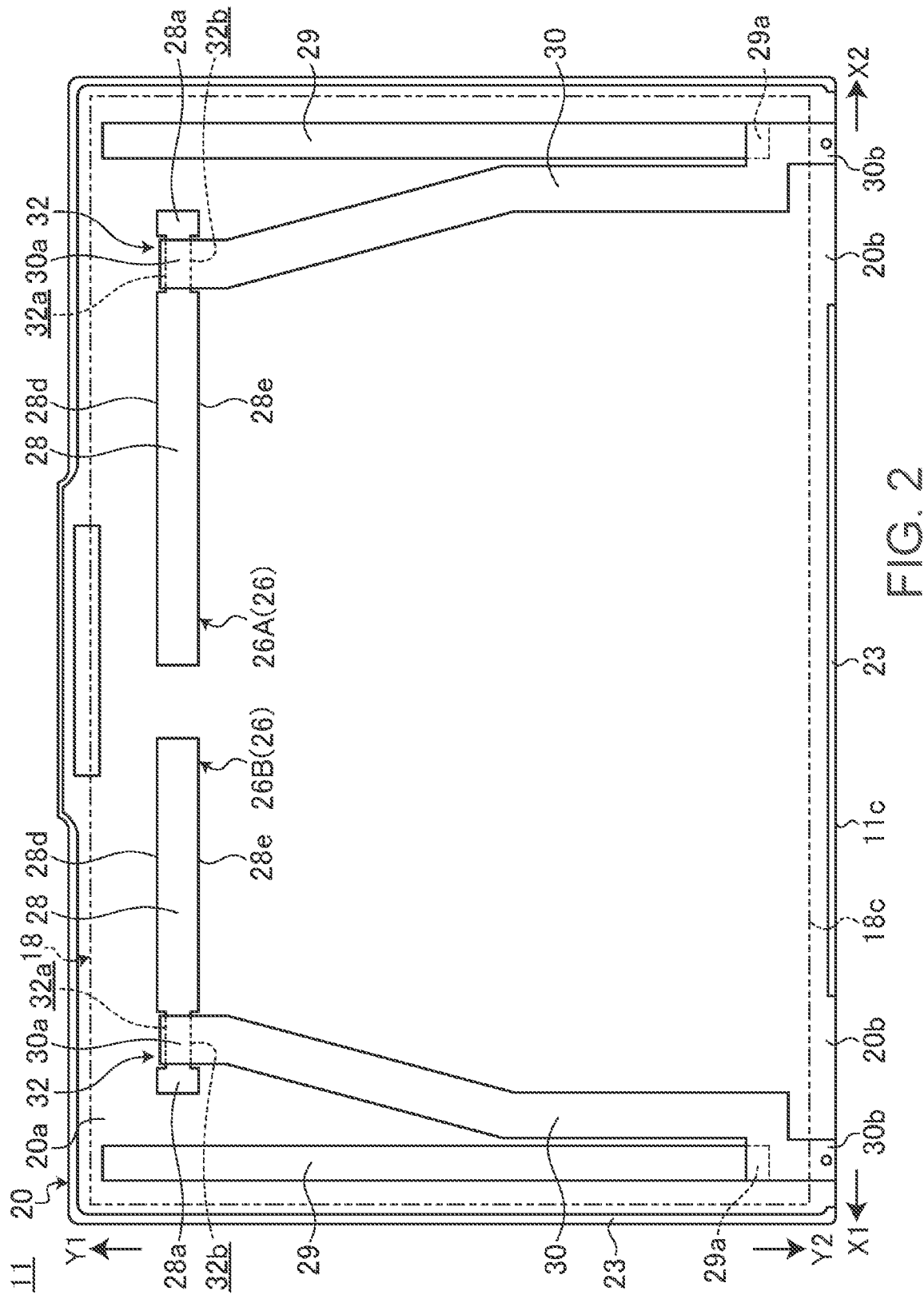
FIG. 2 is a schematic front view of a first chassis.

FIG. 2 is a schematic front view of the first chassis 11. FIG. 2 omits the touch glass 24 and bezel member 22, and illustrates only the outer shape of the display panel 18 with the alternate long and two short dashes line. That is, FIG. 2 illustrates the inner face 20a (rear face of the back face 11b) of the cover member 20 and a tape member 26 adhering to this inner face 20a, and FIGS. 6A to 6C also illustrate the same.

As illustrated in FIG. 2, the cover member 20 has a pair of left and right hinge mount portions 20b that are partially cut-out portions of the standing wall 23 at the lower edge 11c. The hinges 14 are placed at the hinge mount portions 20b. The hinge mount portions 20b also serve as a space, along which wiring is placed, the wiring connecting the display panel 18 and the motherboard or the like in the second chassis 12.

The inner face 20a of the cover member 20 comes with a pair of left and right tape members 26A and 26B, for example. These tape members 26A and 26B are adhesive tape for fixing the display panel 18 to the cover member 20. The number of pieces of double-sided adhesive tape placed may be one or three or more. The tape members 26A and 26B differ in shape and location, but have the same or similar functions and effects. Thus, hereinafter, the tape members 26A and 26B will be collectively referred to as a tape member 26 without distinguishing between them.

The following describes the attachment structure of the display panel 18 to the cover member 20.

Figure 3:
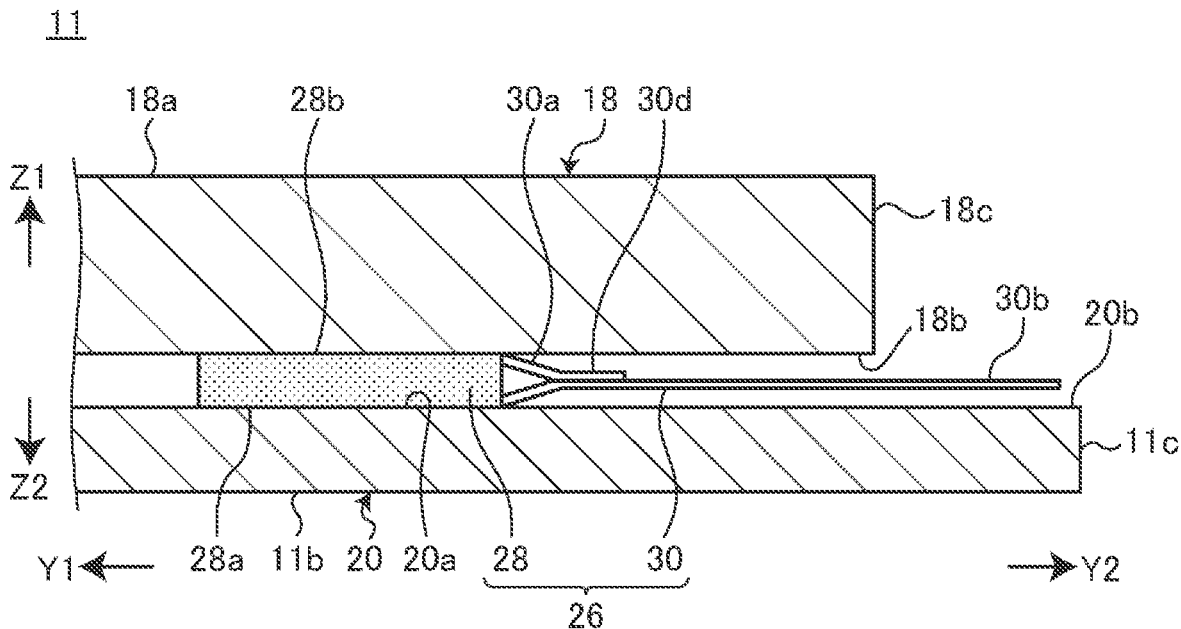
FIG. 3 is a schematic side cross-sectional view of the configuration of fixing a display panel to a cover member with a tape member.

FIG. 3 is a schematic side cross-sectional view of the configuration of fixing the display panel 18 to the cover member 20 with the tape member 26. As illustrated in FIGS. 2 and 3, the tape member 26 has double-sided adhesive tape 28, 29 and handle members 30. FIG. 3 illustrates the connection between the double-sided adhesive tape 28 and the handle member 30 and their periphery.

The double-sided adhesive tape 28, 29 adhesively fixes the rear face 18b of the display panel 18 opposite to the display surface 18a and the inner face 20a of the cover member 20. The double-sided adhesive tape 28, 29 has the property of being releasable by stretching at the ends 28a, 29a, and are components called stretch-release tape, stretch double-sided tape, or LALA tape, for example. As illustrated in FIG. 2, the display panel 18 is fixed to the inner face 20a with the double-sided adhesive tape 28 near the Y1-side edge along the X direction, and is fixed to the inner face 20a with the double-sided adhesive tape 29 near the X1- and X2-side edges along the Y direction.

Note that the double-sided adhesive tape 28, 29 may be configured as a single piece of substantially L-shaped double-sided adhesive tape as a whole. The double-sided adhesive tape 28, 29, however, is cut out from a large sheet of material and formed into a predetermined shape. Thus, the L-shaped tape causes a poor yield and increases component costs. Thus, the double-sided adhesive tape 28, 29 in the present embodiment has a simple linear shape, thereby reducing the component cost.

Note that the first chassis 11 of the present embodiment has the front face 11a covered with the touch glass 24 and the back face 11b covered with the cover member 20. With this configuration, the first chassis 11 has a space for placing a tab that is used to stretch-release the double-sided adhesive tape 28, 29, and the space is limited to the lower edge 11c where the hinge mount portions 20b is located. The double-sided adhesive tape 29 extending in the Y direction have fewer problems because the end 29a is located near the hinge mount portion 20b. The double-sided adhesive tape 28 extending in the X direction, however, is located near the Y1-side edge of the display panel 18, and the end 28a is far from the hinge mount portion 20b.

Then, the tape member 26 of the present embodiment is configured to have a handle member 30 attached to the end 28a of the double-sided adhesive tape 28, thus letting the user pull this handle member 30 to stretch-release the double-sided adhesive tape 28.

The handle member 30 is a sheet-like member thinner than the double-sided adhesive tape 28. The first end 30a of the handle member 30 is adhesively fixed to the end 28a between the rear face 18b and inner face 20a for connection. The handle member 30 has a second end 30b that extends to protrude laterally from the side face 18c of the display panel 18. The user holds this second end 30b by hand or with a tool when they stretch-release the double-sided adhesive tape 28. As illustrated in FIG. 2, the handle member 30 is also adhesively fixed and connected to the end 29a of the double-sided adhesive tape 29 near the second end 30b. That is, the two pieces of double-sided adhesive tape 28 and 29 share the handle member 30 in this embodiment.

The double-sided adhesive tape 29 may be omitted, and in this case, the tape member 26 may include the double-sided adhesive tape 28 and the handle member 30. The double-sided adhesive tape 29 may be connected to a handle member different from the handle member 30, or the end 29a may be placed at the hinge mount portion 20b.

Next, the following describes a specific connection structure between the double-sided adhesive tape 28 and the handle member 30.

Figure 4:
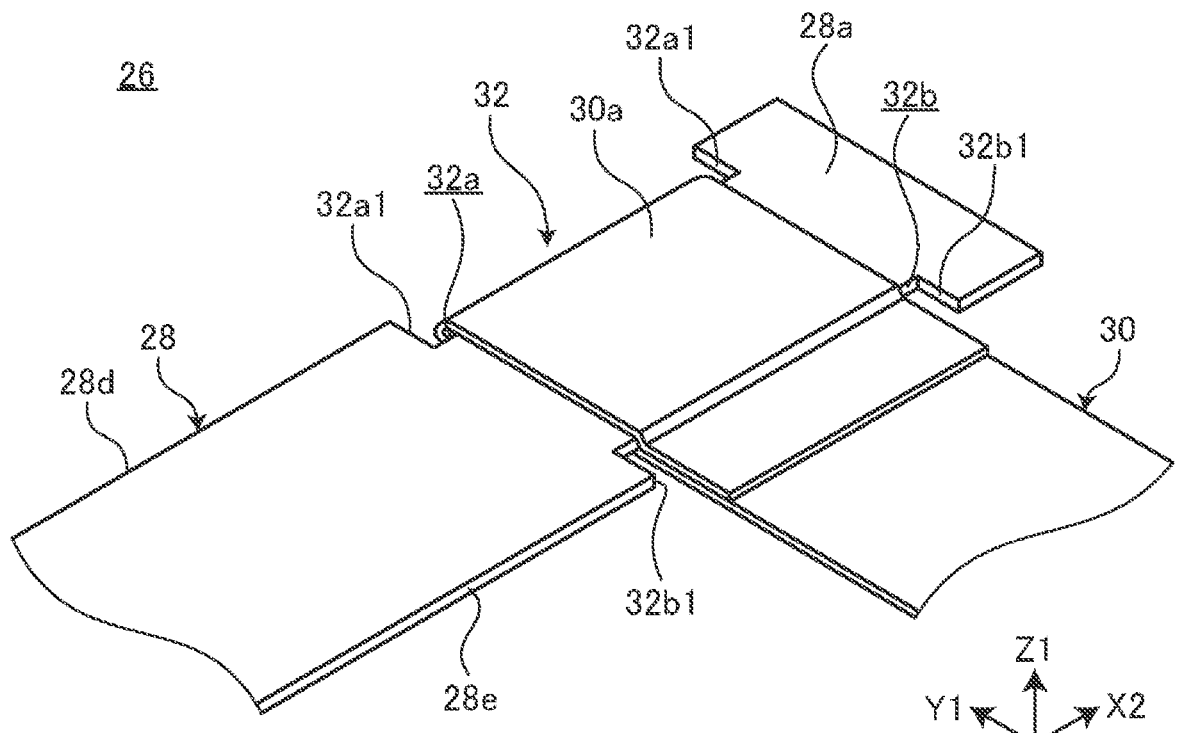
FIG. 4 is a schematic perspective view enlarging the connection between double-sided adhesive tape and a handle member and their periphery.
Figure 5A:
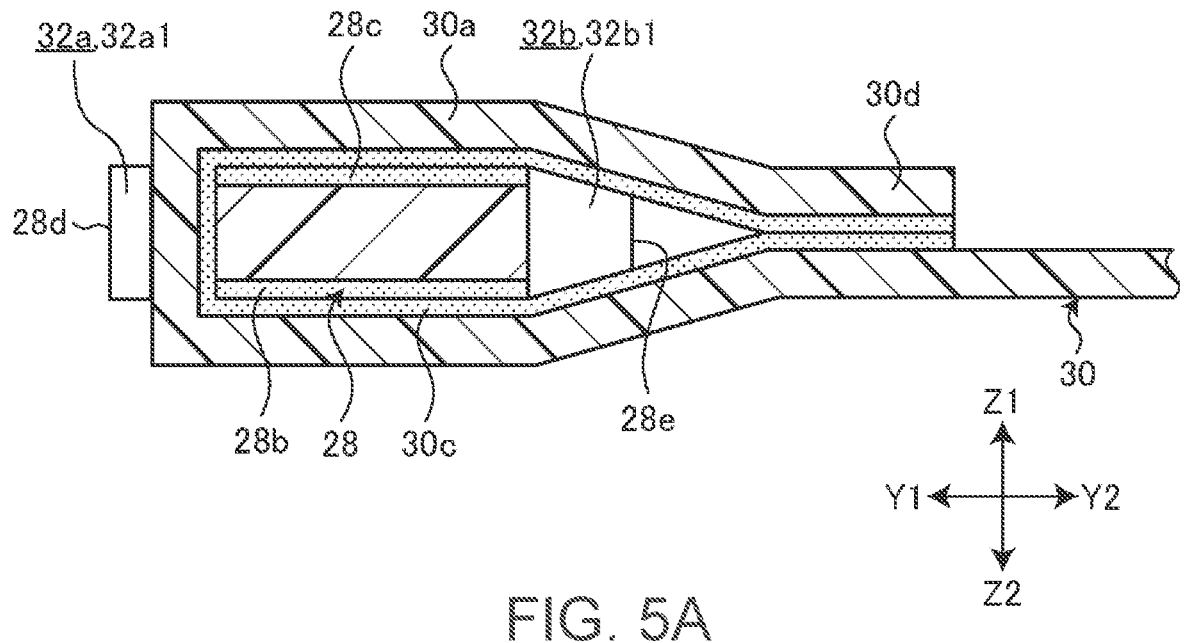
FIG. 5A is a schematic side cross-sectional view enlarging the connection between double-sided adhesive tape and a handle member and their periphery.
Figure 5B:
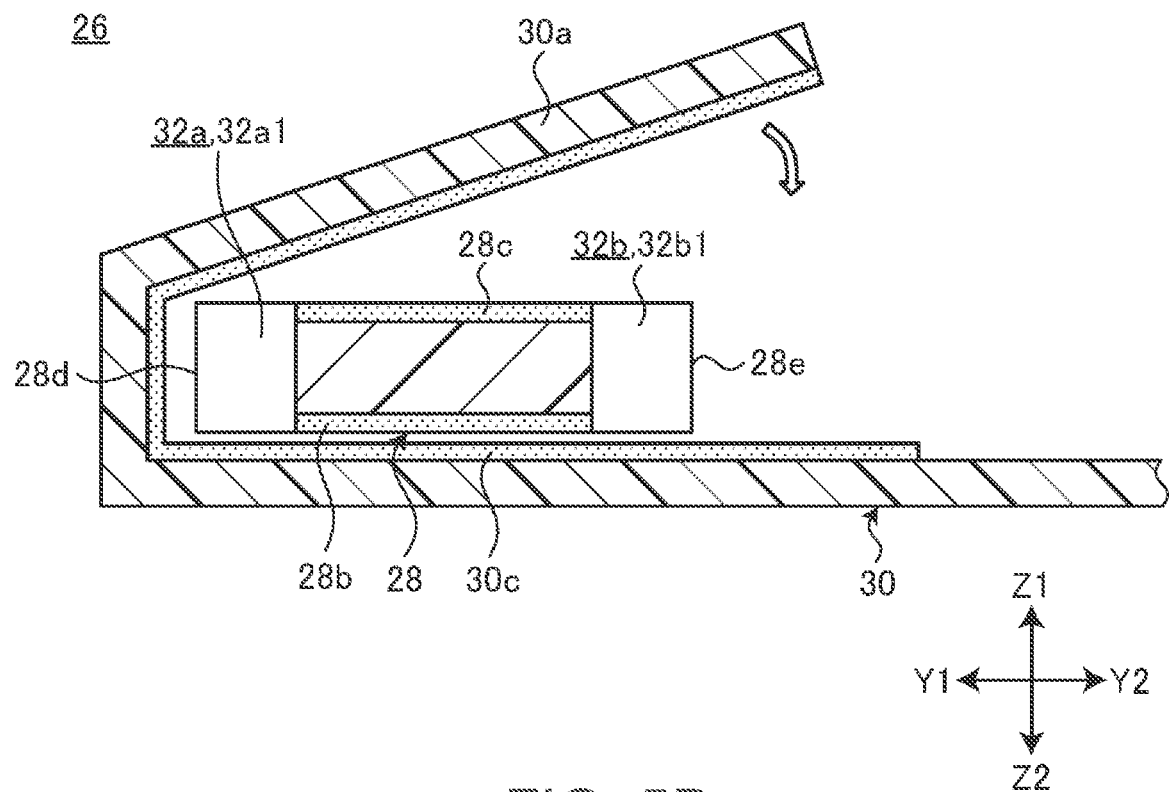
FIG. 5B is a schematic side cross-sectional view, illustrating the operation of connecting the handle member to the double-sided adhesive tape of FIG. 5A.

FIG. 4 is a schematic perspective view enlarging the connection between the double-sided adhesive tape 28 and the handle member 30 and their periphery. FIG. 5A is a schematic side cross-sectional view enlarging the connection between the double-sided adhesive tape 28 and the handle member 30 and their periphery. FIG. 5B is a schematic side cross-sectional view, illustrating the operation of connecting the handle member 30 to the double-sided adhesive tape 28 of FIG. 5A.

As illustrated in FIGS. 3 to 5B, the tape member 26 in this embodiment has a winding end 30a of the handle member 30 and a dumbbell-shaped portion 32 of the double-sided adhesive tape 28.

The winding end 30a is the first end 30a of the handle member 30, and has the same reference numeral assigned as the first end 30a. The winding end 30a is wound around the double-sided adhesive tape 28 in a direction intersecting its longitudinal direction (X direction), in Y direction orthogonal to X direction in this embodiment.

The handle member 30 has an adhesive layer 30c on at least one face of the winding end 30a. The double-sided adhesive tape 28 has a first adhesive layer 28b and a second adhesive layer 28c. The winding end 30a is wound so that the adhesive layer 30c wraps the double-sided adhesive tape 28. At the winding end 30a, wound portions of the adhesive layer 30c are bonded together on one side of the double-sided adhesive tape 28 to constitute a bonded portion 30d, thus having a ring shape as a whole. In this case, the adhesive layer 30c of the winding end 30a is adhesively fixed to each of the adhesive layers 28b and 28c of the double-sided adhesive tape 28.

The dumbbell-shaped portion 32 is a part of the double-sided adhesive tape 28 in the longitudinal direction, specifically, a narrowed portion located slightly inward from the end face of the end 28a. The double-sided adhesive tape 28 has a pair of recesses 32a, 32b placed to direct their receding side outward, and the recesses 32a and 32b are cutouts formed in a pair of side edges 28d and 28e extending in the longitudinal direction. The double-sided adhesive tape 28 has the dumbbell-shaped portion 32 that is a partially narrowed portion in the width direction formed by these recesses 32a and 32b.

These recesses 32a and 32b have a length in the longitudinal direction of the double-sided adhesive tape 28 that is larger than the width dimension of the handle member 30. This configuration allows the handle member 30 to be wrapped around the dumbbell-shaped portion 32 via the recesses 32a and 32b.

Thus, the tape member 26 includes the handle member 30 and the double-sided adhesive tape 28 that are firmly connected by adhesively fixing the adhesive layer 30c to the adhesive layers 28b and 28c and at the same time placing the ring-shaped winding end 30a around the double-sided adhesive tape 28. The tape member 26 also has the dumbbell-shaped portion 32 at the connection between the handle member 30 and the double-sided adhesive tape 28, and the winding end 30a is wrapped around the dumbbell-shaped portion 32. With this configuration, the winding end 30a is caught by the side walls 32a1 and 32b1 of the recesses 32a and 32b in the tape member 26, which more reliably prevents the handle member 30 from coming off the double-sided adhesive tape 28.

As long as the double-sided adhesive tape 29 and the handle member 30 are adhesively fixed to each other, the connecting structure is not particularly limited. For instance, the second end 30b of the handle member 30 may include two single-sided adhesive sheets, and these sheets may catch the double-sided adhesive tape 29 therebetween so that their adhesive faces are fixed to the double-sided adhesive tape 29.

Next, the following describes the operation of stretch-releasing the double-sided adhesive tape 28, 29 via the handle member 30 and the effect of the tape member 26.

Figure 6A:
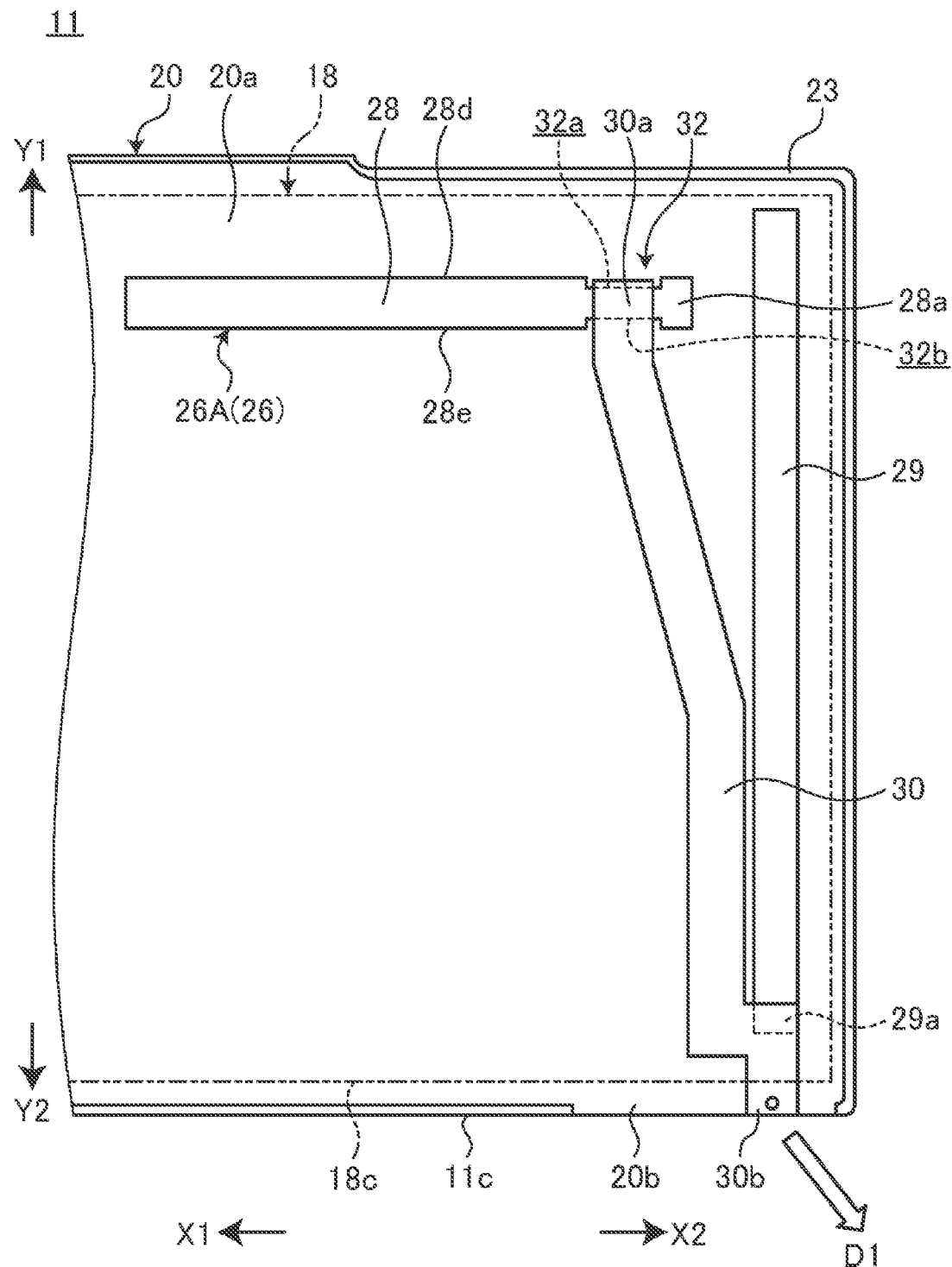
FIG. 6A is a schematic front view partially enlarging the first chassis, illustrating the operation of stretch-releasing the double-sided adhesive tape.
Figure 6B:
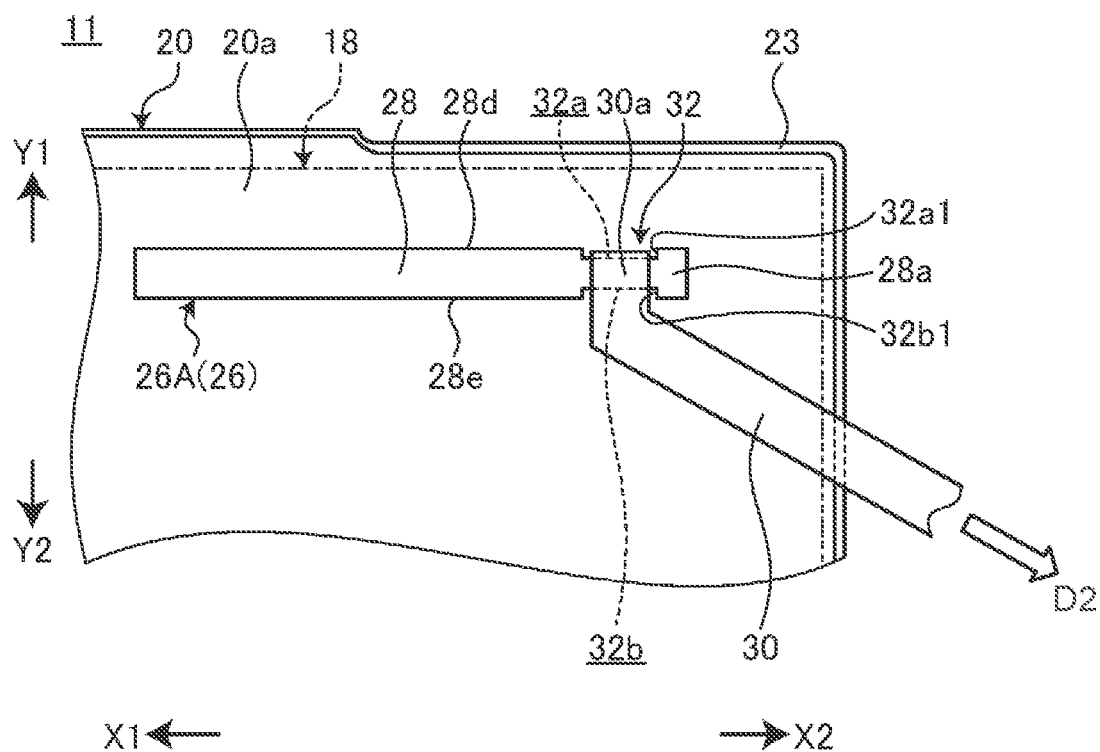
FIG. 6B is a schematic front view illustrating, after the completion of releasing of the double-sided adhesive tape extending in Y direction from the state of FIG. 6A, releasing the double-sided adhesive tape extending in X direction.
Figure 6C:
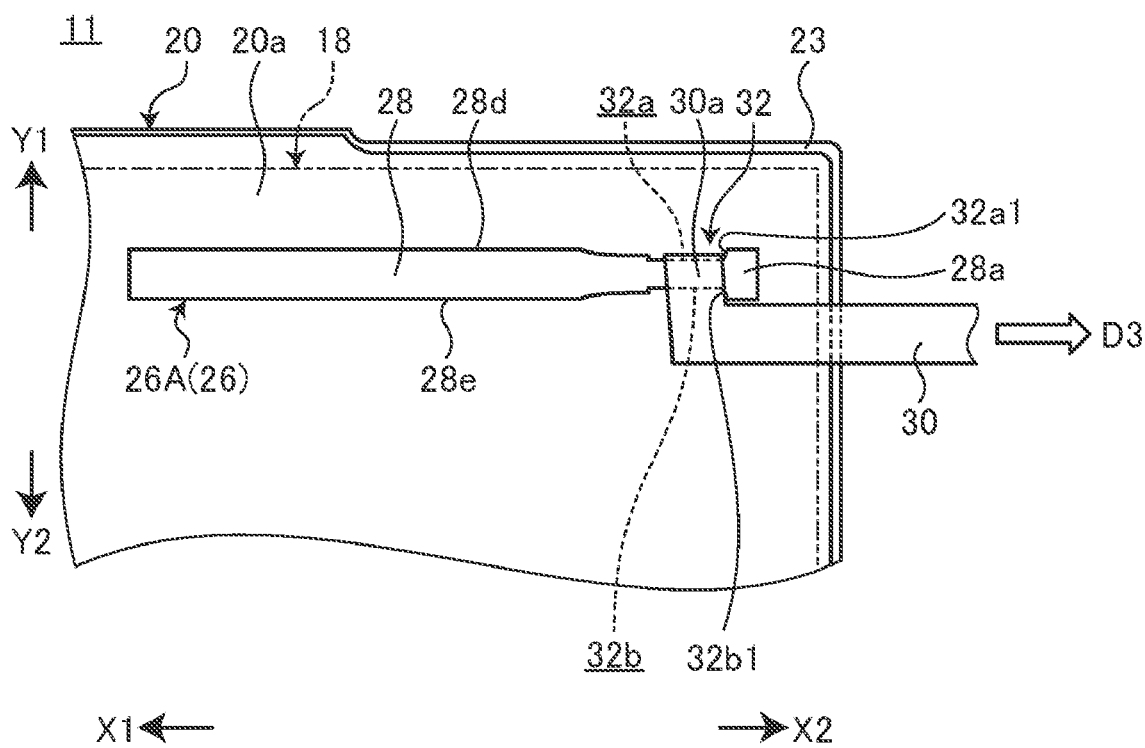
FIG. 6C is a schematic front view illustrating the state of stretching the double-sided adhesive tape continuously from the state of FIG. 6B.

FIG. 6A is a schematic front view partially enlarging the first chassis 11, illustrating the operation of stretch-releasing the double-sided adhesive tape 28, 29. FIG. 6B is a schematic front view illustrating, after the completion of releasing of the double-sided adhesive tape 29 extending in Y direction from the state of FIG. 6A, releasing the double-sided adhesive tape 28 extending in X direction. FIG. 6C is a schematic front view illustrating the state of stretching the double-sided adhesive tape 28 continuously from the state of FIG. 6B.

First, before removing the display panel 18 from the cover member 20, the hinges 14 are removed to remove the first chassis 11 from the second chassis 12. At this time, the wiring between the display panel 18 and the motherboard and other components is also removed. Subsequently, the second end 30b of the handle member 30 exposed at the hinge mount portion 20b is held, and is pulled in Y2 direction, thereby stretch-releasing the double-sided adhesive tape 28, 29.

Next, as illustrated in FIG. 6A, when stretching-releasing the double-sided adhesive tape 28, 29, the second end 30b of the handle member 30 is held with a tool or hand and pulled in the pulling direction D1. Then, the double-sided adhesive tape 29 is first pulled in the pulling direction D1 at the handle member 30, and the end 29a is pulled out to the lateral of the display panel 18. Thus, the end 29a is directly held to be gradually moved in Y1 direction while pulling it in X2 direction, so that the double-sided adhesive tape 29 is stretch-released.

Then, the double-sided adhesive tape 28 is stretch-released. First, as illustrated in FIG. 6B, the handle member 30, which protrudes laterally from the X2-side edge of the display panel 18 when the double-sided adhesive tape 29 is released, is held and pulled in the pulling direction D2. This makes the double-sided adhesive tape 28 thinner so as to gradually taper from the leading end 28a in the pulling direction D2, so that the adhesive layers 28b and 28c are released from the rear face 18b of the display panel 18 and the inner face 20a of the cover member 20.

Further, as illustrated in FIG. 6C, the handle member 30 is pulled in the pulling direction D3, thus pulling the end 28a of the double-sided adhesive tape 28 out toward the lateral of the display panel 18. At this time, the end 28a is directly held to be further pulled in the pulling direction D3, whereby the double-sided adhesive tape 28 can be released from the rear face 18b and the inner face 20a and pulled out to the lateral of the display panel 18.

When stretch-releasing the double-sided adhesive tape 28, the handle member 30 can be pulled in Y2 direction, which is its extending direction, instead of in the pulling directions D2 and D3. In this case, however, the distance until the end 28a is pulled out to the lateral of the display panel 18 is relatively long, and thus the handle member 30 is more likely to come off during this action. Therefore, the end 28a of the double-sided adhesive tape 28 is preferably pulled out to the X2-side edge that is the closest edge of the four edges of the display panel 18.

Meanwhile, as described above, the double-sided adhesive tape 28 on the first chassis 11 of the present embodiment is located far away from the side face 18c of the display panel 18 (see FIG. 2). This makes the handle member 30 long, and means a long distance to pull out the double-sided adhesive tape 28 with the handle member 30. Due to such a configuration, if the handle member 30 is attached to the double-sided adhesive tape 28 only by adhesive force as in the above-described conventional techniques, they may be detached during the pull-out operation. If that happens, the double-sided adhesive tape 28 will remain on the rear face 18b of the display panel 18, making it difficult to remove the display panel 18. Note that also in the configuration of attaching the handle member 30 to the double-sided adhesive tape 28 only by the adhesive force, if the overlapping distance between the handle member 30 and the double-sided adhesive tape 28 is sufficiently large, this can suppress the detachment of the handle member 30. In this case, however, a portion (i.e., the area) of the adhesive layers 28b and 28c of the double-sided adhesive tape 28 that lets the display panel 18 adhere to the cover member 20 will decrease, and the adhesive strength of the display panel 18 will decrease.

The tape member 26 of the present embodiment includes the handle member 30 wrapped around the double-sided adhesive tape 28 in the direction intersecting the longitudinal direction of the tape, while being fixed to the first adhesive layer 28b and second adhesive layer 28c. When the handle member 30 is pulled, the adhesive layer 30c may be released from the adhesive layers 28b and 28c of the tape member 26. In this case, the handle member 30 will not physically come off because the winding end 30a is caught around the double-sided adhesive tape 28. As a result, this tape member 26 prevents the handle member 30 from coming off the double-sided adhesive tape 28. Thus, the electronic apparatus 10 equipped with this tape member 26 prevents the problem that the double-sided adhesive tape 28 remains on the rear face 18b of the display panel 18, making it difficult to remove the display panel 18.

As a result, the display panel 18 can be easily removed from the electronic apparatus 10, which improves serviceability during maintenance, for example. The double-sided adhesive tape 28, 29 of the tape member 26 has a linear shape, and the amount of material used is minimized, thereby reducing the component cost. The handle member 30 of the tape member 26 includes a single sheet member except for at the winding end 30a. This further reduces the component cost, and makes the tape member thinner.

Note that the tape member 26 includes the handle member 30 connected in the direction intersecting the longitudinal direction of the double-sided adhesive tape 28. When pulling the handle member 30 in the pulling directions D2 and D3 to stretch-release the double-sided adhesive tape 28 as illustrated in FIGS. 6B and 6C, the winding end 30a of the handle member 30 may receive a force in the longitudinal direction of the double-sided adhesive tape 28 and slip off the end 28a.

To avoid this, the double-sided adhesive tape 28 of the tape member 26 has the dumbbell-shaped portion 32, around which the winding end 30a of the handle member 30 is placed. This configuration prevents the winding end 30a of the handle member 30 from slipping off because the winding end 30a is caught by the side walls 32a1 and 32b1 of the dumbbell-shaped portion 32, which more reliably prevents the handle member 30 from coming off the double-sided adhesive tape 28.

The dumbbell-shaped portion 32 may be omitted depending on, for example, the winding position of the handle member 30 relative to the longitudinal direction of the double-sided adhesive tape 28 and the distance from the end 28a to the lateral of the display panel 18. This is because, in such cases, the handle member 30 hardly comes off the double-sided adhesive tape 28 without the dumbbell-shaped portion 32.

Figure 7:
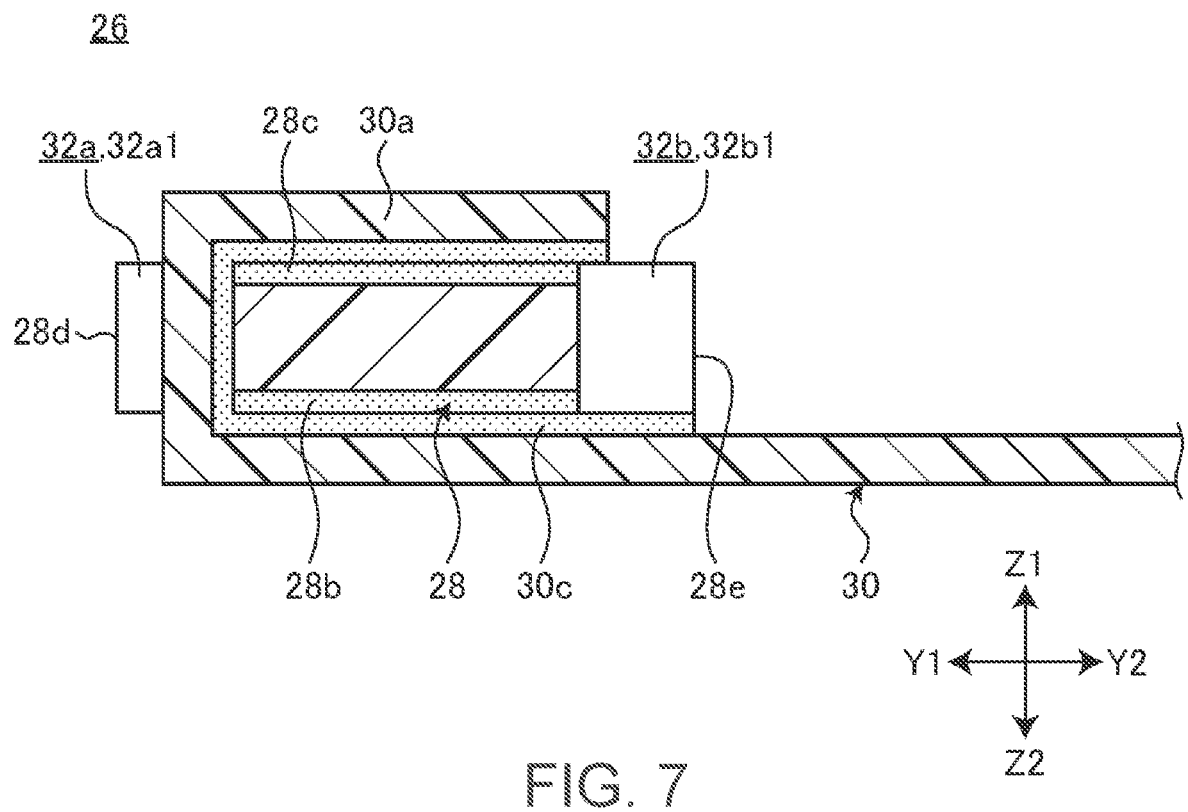
FIG. 7 is a schematic perspective view enlarging the connection between double-sided adhesive tape and a handle member having a winding end according to a modified example, and their periphery.

The winding end 30a may have a configuration other than the ring-shaped structure having wound portions of the adhesive layers 30c that are bonded to each other at the bonded portion 30d. For instance, the winding end 30a illustrated in FIG. 7 has a substantially C-shape in side view. Such a C-shaped winding end 30a also prevents coming-off because the adhesive layer 30c is firmly fixed to the adhesive layers 28b and 28c of the double-sided adhesive tape 28, and the winding end 30a is caught by the side walls 32a1 and 32b1 of the dumbbell-shaped portion 32. Thus, the winding end 30a in FIG. 7 also prevents the handle member 30 from coming off the double-sided adhesive tape 28.

Figure 8:
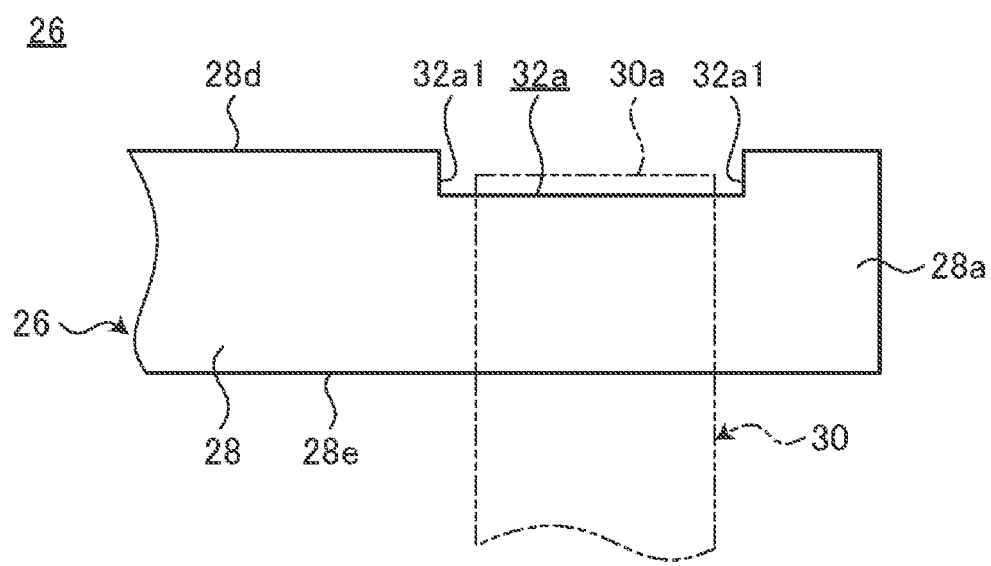
FIG. 8 is a schematic plan view of double-sided adhesive tape according to a modified example.

The catching portion of the double-sided adhesive tape 28 may be other than the dumbbell-shaped portion 32. For instance, as illustrated in FIG. 8, the double-sided adhesive tape 28 may have only one recess 32a without the other recess 32b. In this case also, the winding end 30a is caught by the side wall 32a1 of the recess 32a, thus preventing the handle member 30 from coming off the double-sided adhesive tape 28.

Needless to say, the double-sided adhesive tape 28 may only have the recess 32b instead of the recess 32a. From the viewpoint of preventing the winding end 30a from coming off, however, the double-sided adhesive tape 28 preferably have the recess 32a on the side edge 28d on the opposite side of the second end 30b of the handle member 30 between the pair of side edges 28d and 28e. This is because, as illustrated in FIGS. 6B and 6C, the side wall 32a1 of the recess 32a is more effective than the side wall 32b1 of the recess 32b to prevent the winding end 30a from coming off the double-sided adhesive tape 28.

Particularly, the display panel 18 of the electronic apparatus 10 has a rectangular shape that is horizontally long in X direction, and the double-sided adhesive tape 28 extends in the longitudinal direction of the display panel 18. The handle member 30 extends in Y direction intersecting X direction that is the extending direction of the double-sided adhesive tape 28, and protrudes laterally from the edge (side face 18c) along the longitudinal sides of the display panel 18. This means that the distance of pulling out the end 28a is large when the double-sided adhesive tape 28 is stretch-released. The double-sided adhesive tape 28 therefore preferably has the recesses 32a and 32b to prevent the handle member 30 from coming off.

The present invention is not limited to the above-described embodiments, and can be modified freely without deviating from the scope of the present invention.

The above example shows a configuration of fixing the display panel 18 with the tape member 26. The tape member 26 can be used to fix various other parts that need to be removed, in addition to the display panel 18.

The invention claimed is:
1. A tape member, comprising:
double-sided adhesive tape having a releasable property by stretching; and
a sheet-shaped handle member connected to the double-sided adhesive tape, wherein the handle member is configured to enable a user to hold the handle member when stretch-releasing the double-sided adhesive tape,
wherein the handle member is wound around the double-sided adhesive tape in a direction that intersects a longitudinal direction of the double-sided adhesive tape,
wherein a distal portion of the handle member is bonded, via an adhesive layer, to another portion of the handle member to constitute a bonded portion that is outside of side edges of the double-sided adhesive tape.

2. The tape member according to claim 1, wherein
the double-sided adhesive tape has a recess that is a cutout in at least one of a pair of side edges in the longitudinal direction, and
the handle member is wound around the double-sided adhesive tape at the recess.

3. The tape member according to claim 2, wherein
the double-sided adhesive tape has the recess in each of the pair of side edges wherein a receding side of each of recesses extends outward, thus defining a dumbbell-shaped portion of the double-sided adhesive tape that is a narrowed portion extending in the longitudinal direction, and the handle member is wound around the dumbbell-shaped portion.

4. The tape member according to claim 1, wherein
the handle member has an adhesive layer on one face, and
the handle member has a ring-shaped winding end where the adhesive layer is wound to wrap the double-sided adhesive tape and wound portions of the adhesive layer are bonded to each other.

5. An electronic apparatus comprising:
a chassis member having an inner face;
a display panel having a display surface and a rear face opposite to the display surface, the rear face being supported by the inner face of the chassis member; and
a tape member including: a double-sided adhesive tape having a releasable property by stretching; and a sheet-shaped handle member connected to the double-sided adhesive tape, wherein the handle member is configured to enable a user to hold the handle member when stretch-releasing the double-sided adhesive tape, wherein the tape member fixes the rear face of the display panel to the inner face of the chassis member,
the handle member is wound around the double-sided adhesive tape in a direction that intersects a longitudinal direction of the double-sided adhesive tape,
wherein a distal portion of the handle member is bonded, via an adhesive layer, to another portion of the handle member to constitute a bonded portion that is outside of side edges of the double-sided adhesive tape.

6. The electronic apparatus according to claim 5, wherein
the double-sided adhesive tape has a recess that is a cutout in at least one of a pair of side edges in the longitudinal direction, and
the handle member is wound around the double-sided adhesive tape at the recess.

7. The electronic apparatus according to claim 5, wherein
the double-sided adhesive tape and the handle member have a connection therebetween that is located at a position sandwiched between the rear face of the display panel and the inner face of the chassis member, and
the handle member has an end opposite to the connection, the end protruding lateral of the display panel.

8. The electronic apparatus according to claim 7, wherein
the display panel has a horizontal rectangular shape,
the double-sided adhesive tape extends in a longitudinal direction of the display panel, and
the handle member extends in a direction that intersects an extending direction of the double-sided adhesive tape, and protrudes laterally from an edge in the longitudinal direction of the display panel.

* * * * *